(12) United States Patent
Yatabe et al.

(10) Patent No.: US 6,279,708 B1
(45) Date of Patent: *Aug. 28, 2001

(54) ONE-WAY CLUTCH CONTAINING ROLLING BEARING (75) Inventors: Takayuki Yatabe; Takashi Ogawa; Naoki Fukuda; Kenji Takei; Hisato Yamamoto, all of Kanagawa; Kouzaburo Igari; Masanori Tateishi, both of Shizuoka, all of (JP)

(73) Assignees: NSK Ltd.; NSK-Warner K.K., both of Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/193,717

(22) Filed: Nov. 17, 1998

(30) Foreign Application Priority Data

Nov. 17, 1997 (JP) .................................................. 9-330825
Nov. 4, 1998 (JP) ................................................. 10-327557

(51) Int. Cl.⁷ .................................................. F16D 41/07
(52) U.S. Cl. ...................................... 192/45.1; 192/110 B
(58) Field of Search .......................... 192/45, 45.1, 41 A, 192/107 M, 110 B (56) References Cited

U.S. PATENT DOCUMENTS

| | | |
|---|---|---|
| 3,730,316 | * 5/1973 | Zimmer ............................... 192/41 A |
| 3,938,632 | 2/1976 | Giese et al. . |
| 4,494,636 | * 1/1985 | Wakabayashi et al. ............. 192/41 A |
| 5,038,903 | * 8/1991 | Akagi et al. ......................... 192/41 A |
| 5,271,486 | * 12/1993 | Okamoto et al. ....................... 192/45 |
| 5,438,733 | * 8/1995 | Melcher et al. ......................... 19/293 |
| 5,676,226 | * 10/1997 | Lampela et al. ..................... 192/45.1 |
| 5,711,738 | * 1/1998 | Abe et al. .............................. 475/246 |
| 5,819,899 | * 11/1999 | Iga et al. .............................. 192/45.1 |
| 5,860,749 | * 1/1999 | Hirakawa et al. ..................... 384/492 |
| 5,989,694 | * 11/1999 | Mitamura et al. .................... 428/217 |
| 5,991,977 | * 11/1999 | Weber ..................................... 19/236 |

FOREIGN PATENT DOCUMENTS

| | | |
|---|---|---|
| 8-159165 | 6/1996 | (JP) . |
| 9-014302 | 1/1997 | (JP) . |
| 9-105430 | 4/1997 | (JP) . |
| 9-158965 | 6/1997 | (JP) . |

\* cited by examiner

Primary Examiner—Rodney H. Bonck
Assistant Examiner—Tisha D. Lewis
(74) Attorney, Agent, or Firm—Sughrue, Mion, Zinn, Macpeak & Seas, PLLC (57) ABSTRACT A one-way clutch containing rolling bearing comprises a bearing part 2 and an OWC part 10 sharing an outer race 3 and an inner race 4. The bearing part 2 contains a plurality of balls 9 and the OWC part 10 contains sprags 11a and a ribbon spring 12a. The balls 9 and the sprags 11a are held by a single integral-type cage 13.

15 Claims, 10 Drawing Sheets

ONE-WAY CLUTCH CONTAINING ROLLING BEARING

BACKGROUND OF THE INVENTION

This invention relates to a rolling bearing integrally containing a one-way clutch.

Conventionally, an one-way clutch (hereinafter simply described as OWC) part 100, which has a function of transferring torque only in one direction and racing in the other (opposite) direction when inner and outer races rotate, has been known. The one-way clutch has been used independently or in combination with a rolling bearing 200 for supporting a load as a single part or an assembly. For example, these conventional assembly of the OWC part 100 and the rolling bearing 200 has been suggested in Japanese Patent Examined Publication No. Hei. 6-23579 shown in FIG. 14 or Japanese Utility Model Examined Publication No. Hei. 7-52430 shown in FIG. 15.

In recent years, demand for compacting bearings has been made with upsizing of a basket of a washing machine. On the other hand, the conventional technique using the OWC part 100 independently or in combination with the rolling bearing 200 cannot precisely meet such demand for compacting bearings, because the OWC part 100 and the rolling bearing 200 are juxtaposed in adjacent to each other as a single unit or an assembly.

In addition to this, it is difficult for the conventional technique to reduce a manufacturing cost because of a large number of parts, an increase in the number of assembling steps, etc.

Further, with the assembly, careful handling is required in such a manner that the components are not disassembled when the rolling bearing 200 and the OWC part 100 are fitted or when the assembly is fitted into a rotation shaft.

Furthermore, in addition to the demand for compacting, silent washing machines are demanded as market needs and silence is also required for bearings installed in the washing machines

SUMMARY OF THE INVENTION

It is therefore an object of the invention to provide an OWC containing rolling bearing which meets the demand for compacting an OWC containing bearing and is reduced in costs and easily handled at the assembly process and installation process.

It is another object of the invention to improve silence of bearings.

The above-mentioned object can be attained by a one-way clutch containing rolling bearing, according to the present invention, which comprises:
- a common inner race;
- a common outer race;
- a bearing part including a plurality of rolling elements;
- a one-way clutch part including a plurality of wedge elements and a spring element, the bearing part and the one-way clutch part sharing the common inner race and the common outer race; and
- a single cage disposed between the common inner race and the common outer race for holding the rolling elements and the wedge elements.

In the above-mentioned one-way clutch containing rolling bearing, it is preferable that each of surfaces of said inner race and said outer race which are brought in slide-contact with said wedge elements has surface roughness of 0.6 $\mu$mRa or less.

Further, the above-mentioned object can be attained by a one-way clutch containing rolling bearing, according to the present invention, which comprises:
- an inner race;
- an outer race;
- a plurality of rolling elements rotatably disposed between the inner race and the outer race;
- one-way clutch elements disposed between the inner race and the outer race and each changeable its posture between a first position preventing a relative rotation between the inner race and the outer race when the inner race is moved relative to the outer race in a first direction and a second position allowing the relative rotation when the inner race is moved relative to the outer race in a second direction opposite to the first direction; and
- a common cage disposed between the inner race and the outer race for holding the rolling elements and the one-way clutch elements.

In the above-mentioned one-way clutch containing rolling bearing according to the present invention, it is preferable to further comprise a spring member which urges each of the one-way clutch elements to the first position.

In the above-mentioned one-way clutch containing rolling bearing according to the present invention, it is preferable that each of the one-way clutch elements includes in a cross-section a first portion which is always brought in slide-contact with the inner peripheral surface of the outer race and a second portion which is always brought in slide-contact with the outer peripheral surface of the inner race when the posture of the one-way clutch element is in the first position, in which a distance between the first portion and the second portion is longer than a distance between the inner peripheral surface of the outer race and the outer peripheral surface of the inner race in a radial direction of the bearing.

In addition, in the above-mentioned one-way clutch containing rolling bearing according to the present invention, it is preferable that the one-way clutch elements include a plurality of wedge elements.

Further, in the above-mentioned one-way clutch containing rolling bearing according to the present invention, it is preferable that at least one of the outer peripheral surface of the inner race and the inner peripheral surface of the outer race, which is brought in face-contact with the wedge element, has a surface roughness of 0.6 $\mu$mRa or less.

Furthermore, in the above-mentioned one-way clutch containing rolling bearing according to the present invention, it is advantageous that both the outer peripheral surface of the inner race and the inner peripheral surface of the outer race, which are respectively brought in face-contact with the wedge element, have a surface roughness of 0.6 $\mu$mRa or less.

DETAILED DESCRIPTION OF THE PREFERRED EMBODIMENTS

Figure 1:
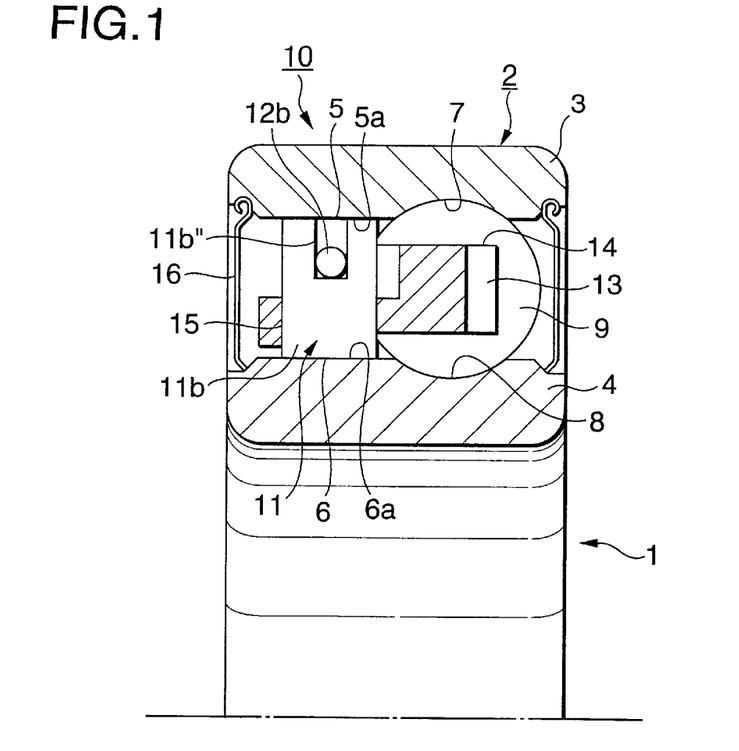
FIG. 1 is a fragmentary longitudinal sectional front view to show a first embodiment of the invention.
Figure 2:
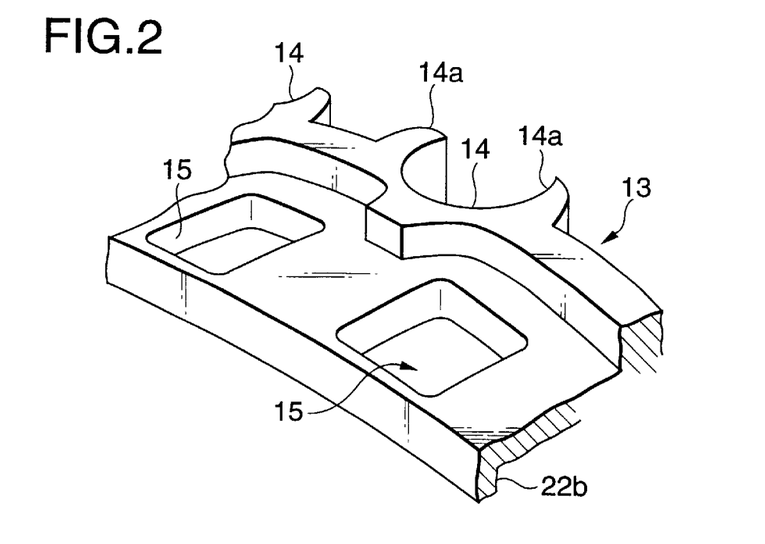
FIG. 2 is an enlarged fragmentary perspective view to show an example of a cage in the first embodiment of the invention.
Figure 9:
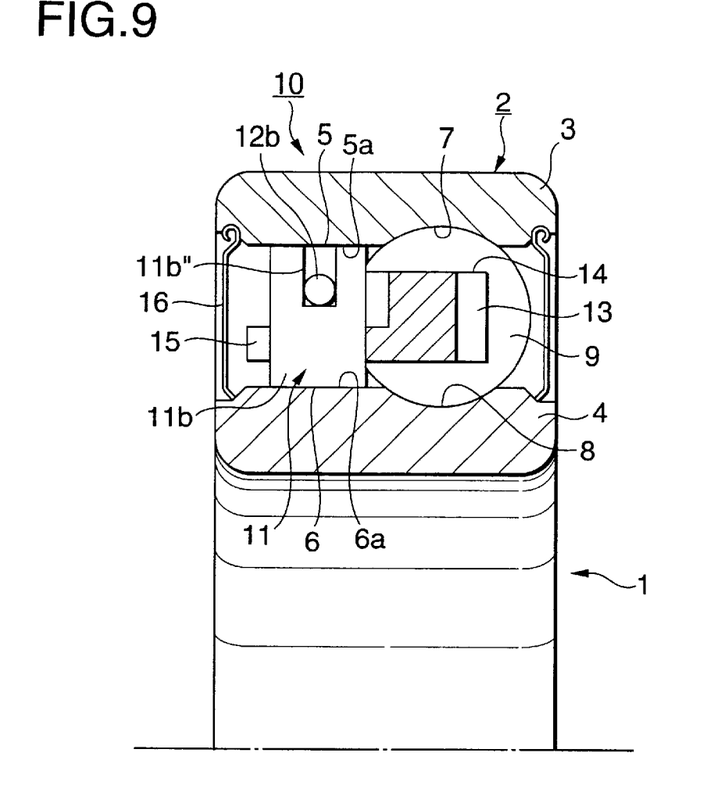
FIG. 9 is a fragmentary longitudinal sectional front view to show a fourth embodiment of the invention.
Figure 10:
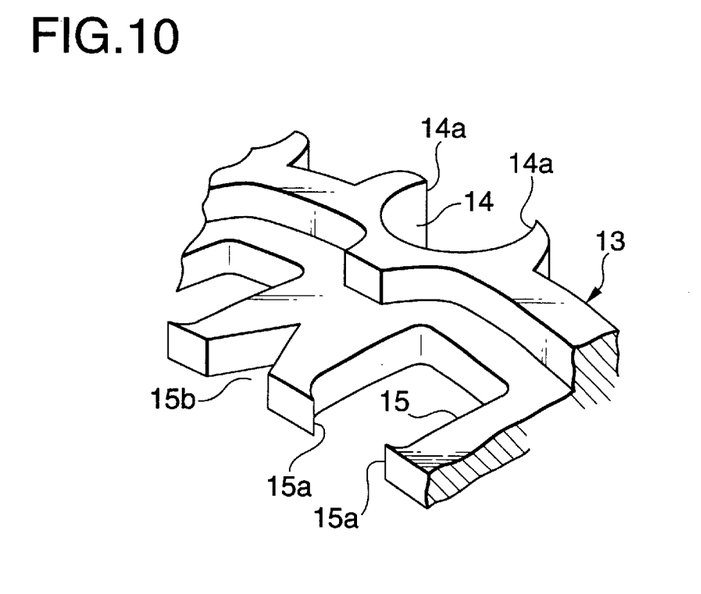
FIG. 10 is an enlarged fragmentary perspective view to show an example of a cage in the fourth embodiment of the invention.
Figure 11:
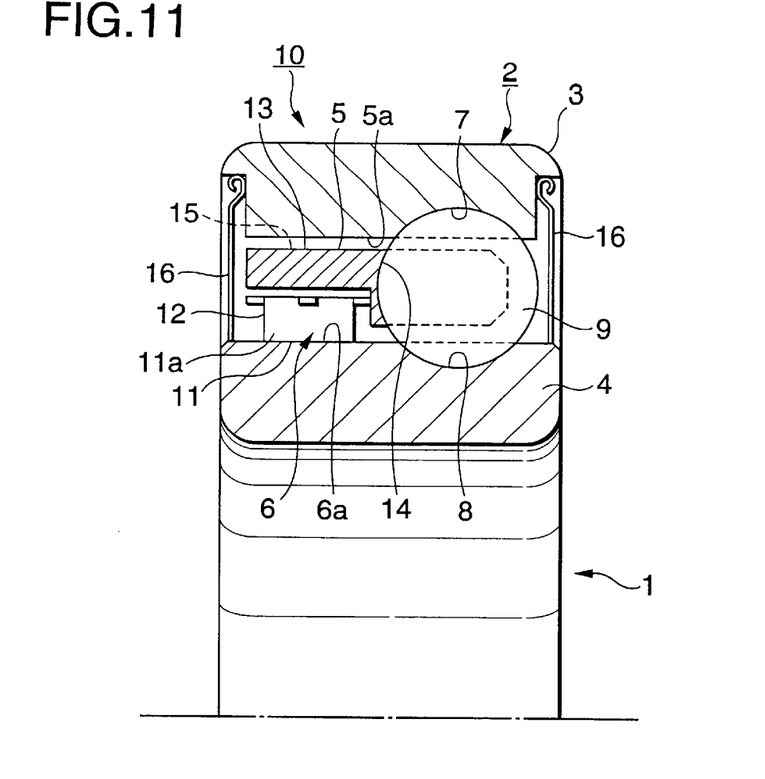
FIG. 11 is a fragmentary longitudinal sectional front view to show a fifth embodiment of the invention.
Figure 12:
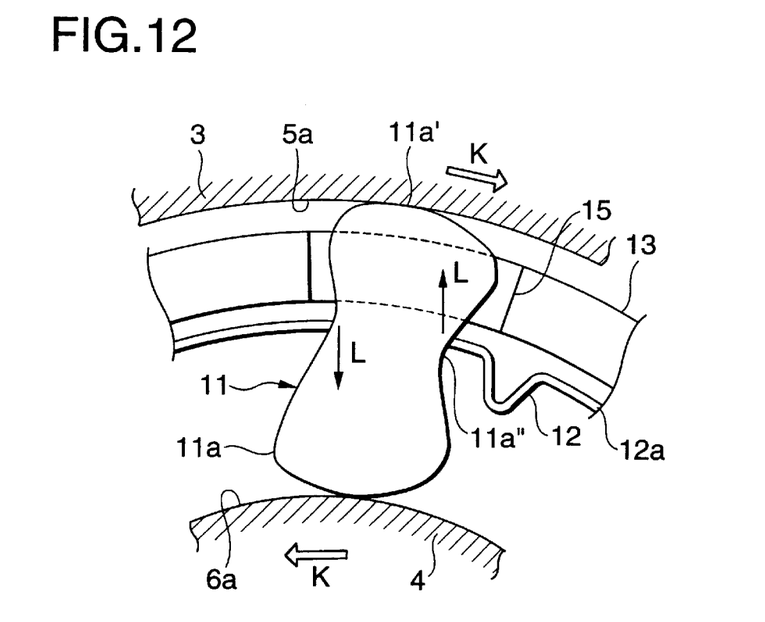
FIG. 12 is a fragmentary longitudinal sectional side view to show a part of the main part of the fifth embodiment of the invention on an enlarged scale.

Referring now to the accompanying drawings, preferred embodiments of rolling bearings according to the invention are hereinafter described. FIG. 1 and FIG. 2 show a first embodiment of the rolling bearing according to the present invention. FIG. 3 to FIG. 6 show a second embodiment. FIG. 7 and FIG. 8 show a third embodiment. FIG. 9 and FIG. 10 show a fourth embodiment. FIG. 11 and FIG. 12 show a fifth embodiment.

The embodiments of the ball bearings are described and shown in the drawings as embodiments of OWC containing rolling bearings of the invention. The invention is, however, not limited to them and roller bearings or the like can also be utilized or modified in the scope of the invention.

An OWC containing rolling bearing 1 is divided into a bearing part 2 and an OWC part 10, which commonly share an outer race 3 and an inner race 4.

The bearing part 2 contains a plurality of rolling balls as one example of the rolling element 9. The rolling elements 9 are disposed between raceway grooves 7 and 8 placed in an inner peripheral surface 5 of the outer race 3 and an outer peripheral surface 6 of the inner race 4. The OWC part 10 contains wedge elements 11 which are disposed in parallel with the bearing part 2 between the outer race 3 and the inner race 4 and a spring element 12 for holding the wedge elements 11 in the radial direction of the bearing. An integral-type cage 13 is provided between the outer race 3 and the inner race 4 in such a manner that the rolling elements 9 and the wedge elements 11 are held by the integral-type cage 13.

Note that an inner diameter, an outer diameter and a width of each of the outer race 3 and the inner race 4 can be designed in such a manner that these are the same as a conventional or ordinal rolling bearing. In other words, it is not necessary to prepare an inner or outer race which having specific/exclusive dimensions or configurations for the present invention, so inner and outer races of the conventional bearing are applicable.

Further, grease may or may not be filled in a space between the inner race and the outer race in this embodiment. On the other hand, the present invention is not limited to the use of grease. In accordance with the demands or environments, lubricant oil or a lubricant containing polymer member is applicable instead of the grease. If a grease which comprises a urea-type thickener and an ether oil (as a base oil) having a viscosity of 103 cst at 40° C. and which has a consistency (60 w) of 290 is utilized, it is advantageous to resistance to drag noise particularly for enhancing silence.

Figure 3:
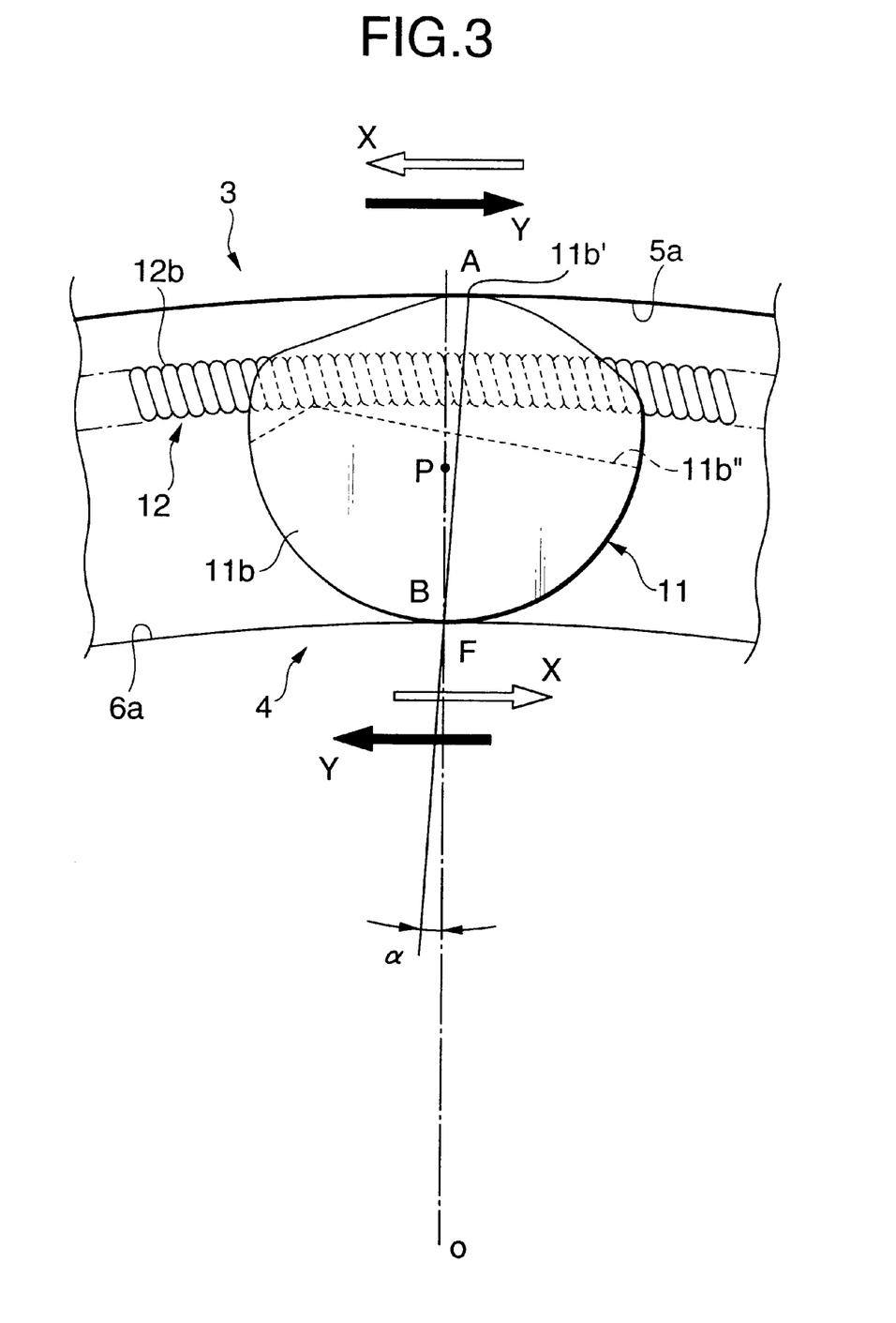
FIG. 3 is a fragmentary longitudinal sectional side view to show a part of the main part of the first embodiment of the invention on an enlarged scale.

For example, a cam, a sprag, etc., which is formed like a rotatable odd cylinder and comprises a large-diameter part wider than a distance between the inner peripheral surface of the outer race and the outer peripheral surface of the inner race is used as the wedge element 11. In other words, as shown in FIG. 3 the wedge element 11 is disposed between the inner race and the outer race and is changeable its posture between a first position preventing a relative rotation between the inner race and the outer race when the inner race is moved relative to the outer race in a first direction (X) and a second position allowing the relative rotation when the inner race is moved relative to the outer race in a second direction (Y) opposite to the first direction.

The spring element 12, such as a garter spring, a ribbon spring, etc, is placed on the above-mentioned cam or sprag. The spring element 12 urges the cam or the sprag so that the large-diameter part of the cam or sprag always comes in contact with the inner peripheral surface of the outer race and the outer peripheral surface of the inner race is used as the spring element 12.

The wedge element 11 and the spring element 12 described above are not limited to those shown in the figures and can be changed to other elements appropriately in the scope of the invention.

The integral-type cage 13 is formed of a polyamide resin such as nylon 66 or 46. The integral-type cage 13 comprises a plurality of ball pawl pockets 14 for holding the balls 9 and wedge element holding pockets 15 for holding the wedge element 11. The ball pawl pockets 14 and the wedge element holding pockets 15 are placed back to back integrally in a circumferential direction for holding the rolling elements 9 and the wedge elements 11 at the same time, as shown in FIGS. 1 and 2.

The ball pawl pockets 14 and the wedge element holding pockets 15 are provided in any numbers and in any forms; the numbers thereof and the forms thereof can be selected arbitrarily in the scope of the invention.

As shown in FIG. 1, a seal plate 16 is provided for sealing a space between the inner and outer races. The seal plate 16 is made from an iron plate in the embodiment, but any other known seal form such as a rubber seal can also be used in the scope of the invention.

In the embodiment according to the present invention, the OWC function is contained in the bearing 1. The inner race and the outer race of the ordinal rolling bearing are utilized and also a single cage 13 holds both the balls 9 of the bearing part 2 and the wedge elements 11 of the OWC part 10. Therefore, the structure is designed extremely compact and the cage can also be manufactured easily at low costs. Resultantly, bearing assembly is facilitated and costs can also be reduced.

In this case, preferably the surface roughness of a wedge element running face (5a or 6a) in the inner peripheral surface 5 of the outer race 5 or the outer peripheral surface of the inner race is set to 0.6 μmRa or less to improve silence.

Note that in this case, more preferably the surface roughness of wedge element running faces 5a and 6a in the inner peripheral surface 5 of the outer race and the the outer peripheral surface 6 of the inner race are set to 0.6 μmRa or less to further improve silence.

If the surface roughness of the wedge element running face 5a and/or 6a is set to 0.6 μmRa or less as described above, it contributes to improvement in silence which has not been obtainable in the conventional art. The bearing with improved surface roughness of the wedge element running face in the outer peripheral surface of the inner race is easy to manufacture and is preferred for more enhancing silence.

Figure 13:
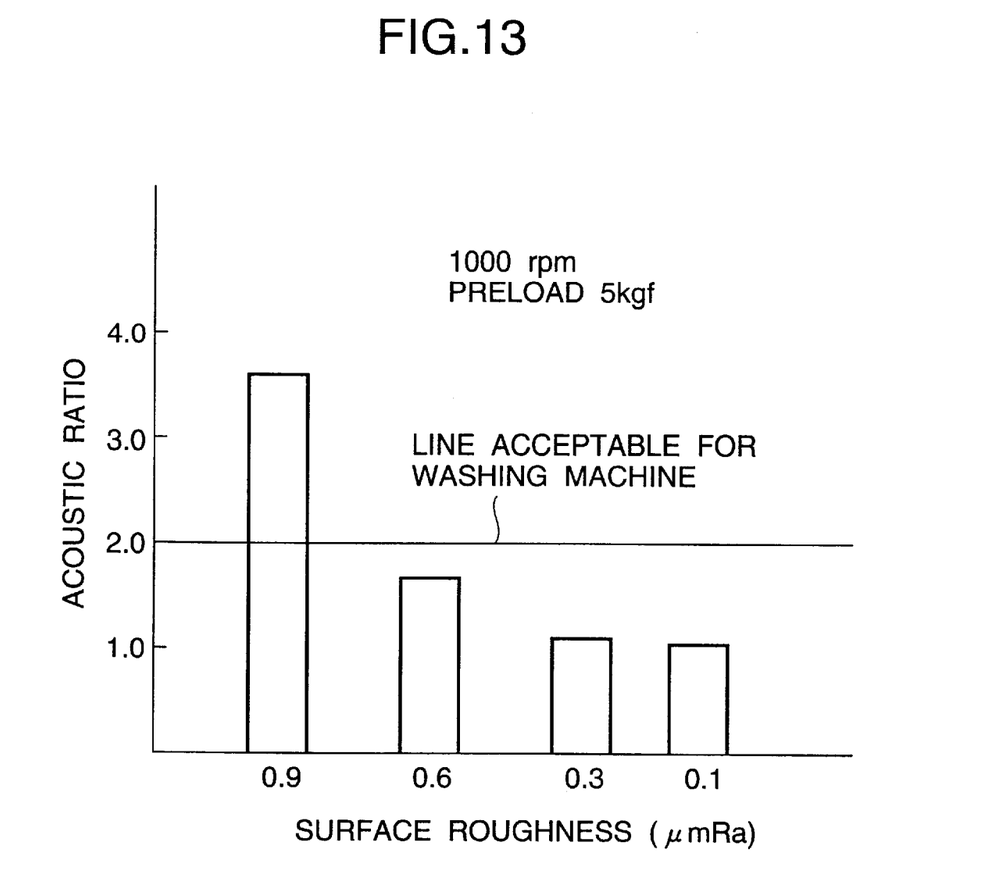
FIG. 13 is an acoustic ratio graph according to different surface roughness of wedge running face.

FIG. 13 is an acoustic ratio graph according to different surface roughness (μmRa) of the wedge element running face 5a (6a) in experiment executed under the experimental conditions listed below. In this case, the line with acoustic ratio 2.0 is an allowable line with washing machines. The acoustic ratio is a value resulting from converting surface roughness 0.3 μmRa in the experiment into 1.0.

Figure 14:
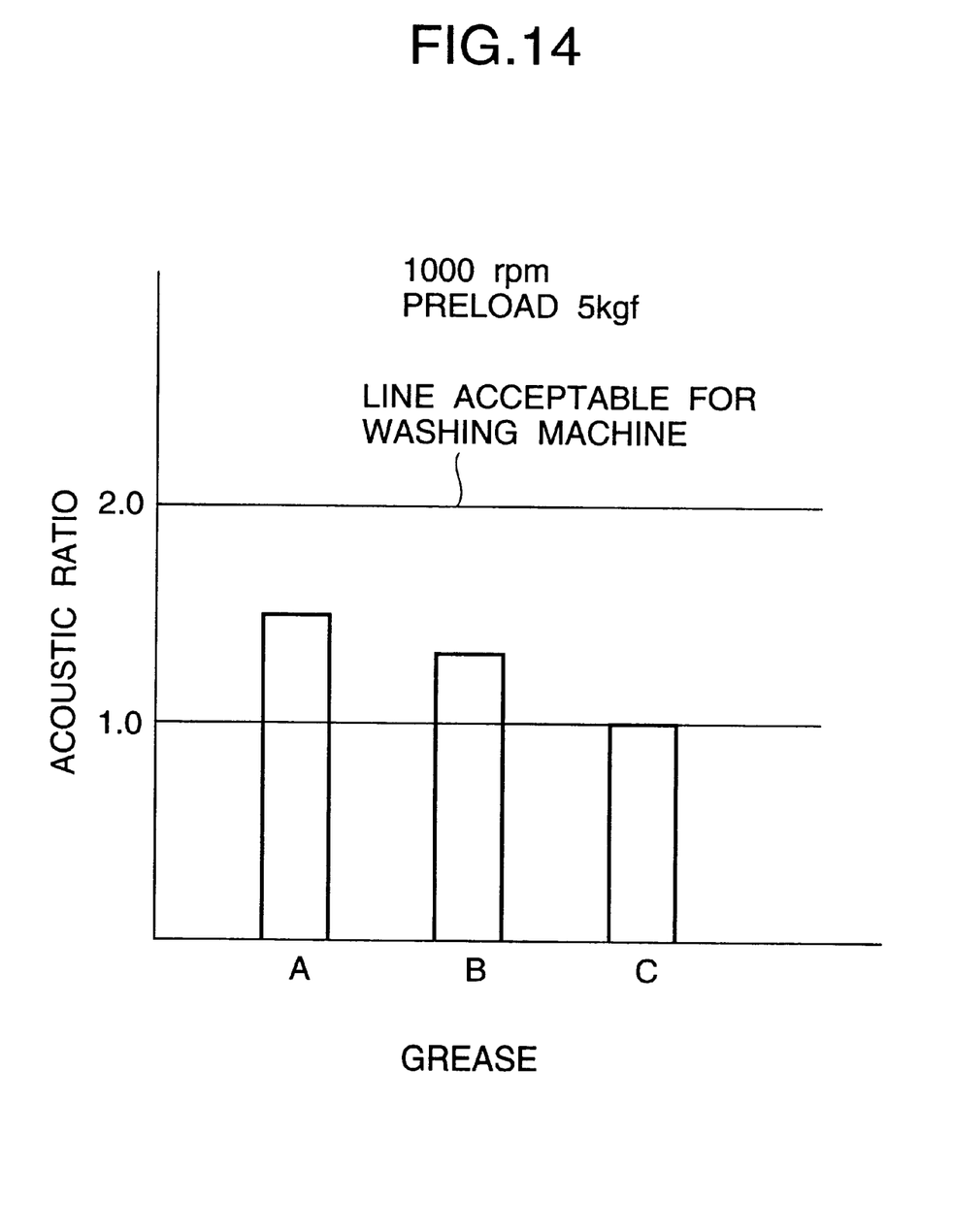
FIG. 14 is an acoustic ratio graph according to different grease.
Figure 15:
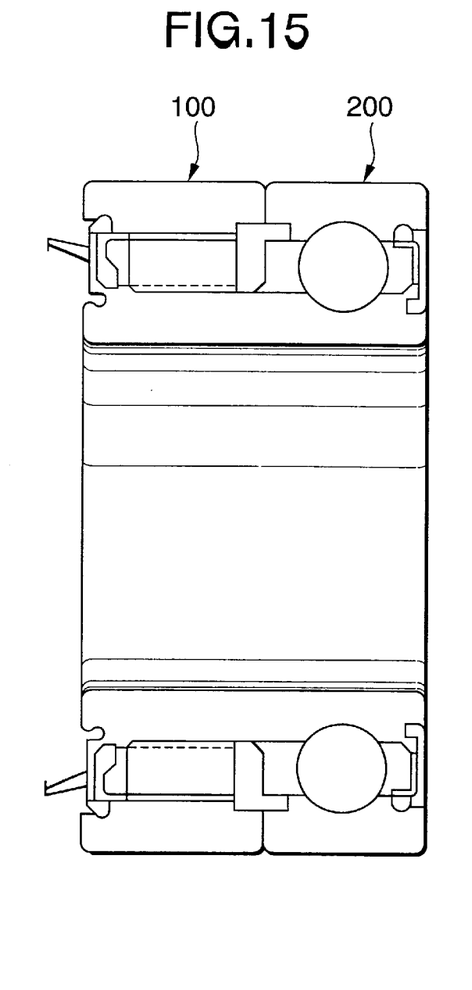
FIG. 15 is a fragmentary longitudinal sectional view to show a conventional example.
Figure 16:
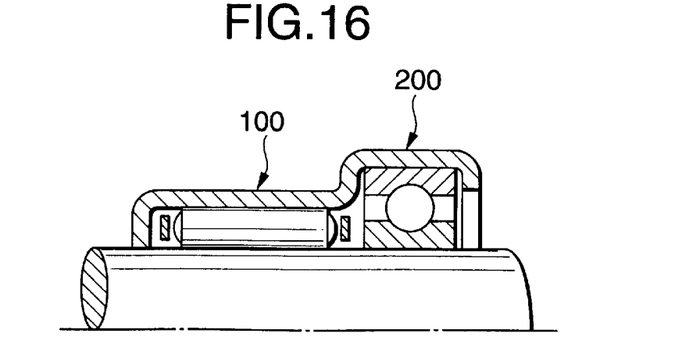
FIG. 16 is a fragmentary longitudinal sectional view to show a conventional example.

[Experimental Conditions]
Bearing: One-way clutch containing ball bearing
    Inner diameter: Ø25 (25 mm)
    Outer diameter: Ø52 (52 mm)
    Width: 15
Surface roughness of sliding surface: Both inner and outer races have the same roughness.
Grease: a grease which comprises a urea-type thickener and an ether oil (as a base oil) having a viscosity of 103 mm2/s at 40° C. and which has a blend consistency (60 w) of 290 at 25° C.
Number of revolutions: 1000 rpm
Preload: 5 kgf FIG. 14 is an acoustic ratio graph according to different grease in experiment executed under the experimental conditions listed below. Table 1 lists the used grease A, B, and C properties, wherein the values enclosed in parentheses indicate the tolerance. In this case, the line with acoustic ratio 2.0 is an allowable line with washing machines.

[Experimental Conditions]
Bearing: One-way clutch containing ball bearing
    Inner diameter: Ø25 (25 mm)
    Outer diameter: Ø52 (52 mm)
    Width: 15 mm
Surface roughness of sliding surface:
    Outer race: 0.3 μmRa
    Inner race: 0.3 μmRa
Number of revolutions: 1000 rpm
Preload: 5 kgf

TABLE 1

|  | B | C | A |
|---|---|---|---|
| Thickener | Lithium soap | Lithium soap | Urea compound |
| Base oil | Mineral oil | Ester oil | Ether oil |
| Base oil viscosity 40 ° C. mm²/s | 130 | 26 | 103 (60–160) |
| Blend consistency 25 ° C. 60 w | 273 | 245 | 290 (260–290) |

Embodiments

Referring now to the accompanying drawings, preferred embodiments of rolling bearings according to the invention are hereinafter described.

[First Embodiment]

In a first embodiment of the invention, a plurality of cams 11b are used as wedge elements 11 and a garter spring 12b is used as a spring element 12. They together with balls 9 are held by an integral-type cage 13 (see FIG. 1 to FIG. 3).

The cam 11b is formed like a rotatable odd cylinder. The cam 11b comprises a large-diameter part 11b' (width of the line connecting points A and B in FIG. 3) larger than a width between an inner peripheral surface 5 of an outer race 3 and an outer peripheral surface 6 of an inner race 4 along the radial direction of the bearing. The cam 11b also comprises a garter spring 12b placement groove 11b". The garter spring 12b is placed across the placement groove 11b" of each cam 11b.

The large-diameter part 11b' of the cam 11b is urged by the garter spring 12b so as to always come in contact with the outer race 3 and the inner race 4.

The cam 11b shown in the embodiment is only an example of the cam 11b and can be changed in shape arbitrarily in the scope of the invention.

As shown in FIG. 2, the integral-type cage 13 in the embodiment comprises a plurality of ball pawl pockets 14 with pawls 14a for holding balls 9 and cam holding pockets 15 having cam holding holes for holding the cams 11b. The ball pawl pockets 14 and the cam holding pockets 15 are placed back to back and molded in one piece by a radial draw. The rolling elements 9 and the cams 11b are held simultaneously by the integral-type cage 13 while arranged in a circumferential direction (see FIG. 1 and FIG. 2).

In the embodiment, an inner flange 22b is formed and serves as a grease dam, whereby lubricity of the cam can be enhanced (see FIG. 1 and FIG. 2).

Further, a grease which comprises a urea-type thickener and an ether oil (as a base oil) having a viscosity of 103 cst at 40° C. and which has a consistency (60 w) of 290 is utilized, it is advantageous to resistance to drag noise.

The ball pawl pockets 14 and the cam holding pockets 15 are provided in any numbers in response to specific embodiments; the numbers thereof are not limited. In the embodiment, the inner diameter surfaces of the ball pawl pockets 14 and the cam holding pockets 15 are roughly flush with each other as shown in FIG. 1, but the invention is not limited to it.

In the embodiment, as shown in FIG. 1, raceway grooves 7 and 8 are formed at the right side from the centers of the outer race 3 and the inner race 4 respectively. The bearing part 2 is placed on the right space, and an OWC part 10 is formed in a left space from the space of the bearing part 2.

Therefore, as shown in FIG. 3, the cam 11b is in contact with the outer race 3 and the inner race 4 at the points A and B of the large-diameter part 11b. A distance between the points A and B is made wider than the width between the inner and outer races in such a manner that the points A and B define a block rod (strato) between the inner and outer races when the inner and outer races are relatively rotated in a direction along an arrow X.

The points A and B are always brought into contact with the outer race 3 and the inner race 4 by the garter spring 12b when the inner and outer races are relatively rotated in a direction along an arrow Y.

If the outer race 3 attempts to rotate in a counterclockwise direction as indicated by the arrow (X) in FIG. 3 (or the inner race 4 attempts to rotate in a clockwise direction), the points A and B serve as a block rod for transferring torque the outer race 3 to the inner race 4 (or from the inner race 4 to the outer race 3) through the whole cam 11b.

In contrast, even if the outer race 3 attempts to rotate in a clockwise direction as indicated by arrow (Y) (or the inner race 4 attempts to rotate in a counterclockwise direction), the points A and B do not serve as the block rod, thus the outer race 3 and the inner race 4 race independently of each other and no torque is transferred.

A ball cage and a wedge element cage are formed in one piece, so that the cage revolves at the rotation time of the rolling bearing, whereby the relative sliding speed of the wedge element sliding surface between the inner and outer races and the wedge element lowers to about ⅗ as compared with the case where the wedge element cage is a separate body. It is extremely advantageous acoustically.

The embodiment uses the garter spring 12b and applies a uniform spring force to the cam 11b, so that variations in drag noise on the contact face are small, the fact of which is advantageous to silence.

Further, in the above-mentioned one-way clutch containing rolling bearing according to the present invention, in order to improve the silence it is preferable that at least one of the wedge element running surface 6a in the outer peripheral surface 6 of the inner race and the wedge element running surface 5a in the inner peripheral surface 5 of the outer race, which is brought in face-contact with the wedge element, has a surface roughness of 0.6 μmRa or less.

However, note that if both of the running surfaces 5a and 6a have surface roughness of 0.6 μmRa or less, a further improvement of the silence can be ensured.

[Second Embodiment]

Figure 4:
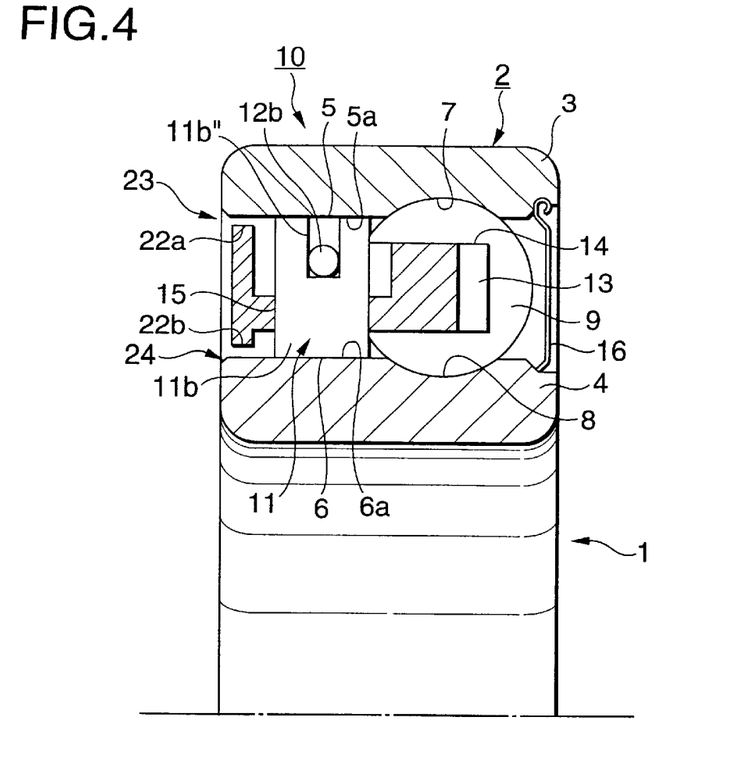
FIG. 4 is a fragmentary longitudinal sectional front view to show a second embodiment of the invention.
Figure 5:
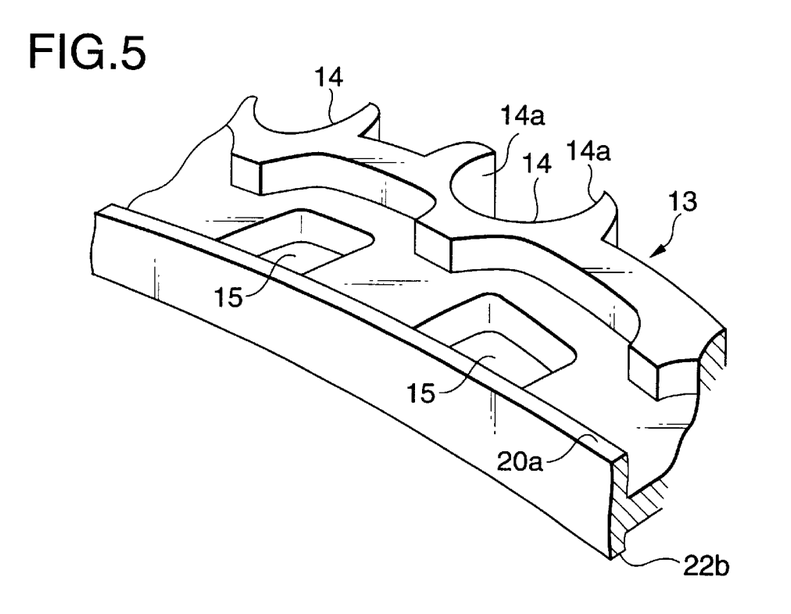
FIG. 5 is an enlarged fragmentary perspective view to show an example of a cage in the second embodiment of the invention.

A second embodiment of the invention has a roughly similar configuration to that of the first embodiment except that each wedge element holding pocket (cam holding pocket) 15 of an integral-type cage 13 has an outer flange 22a and an inner flange 22b in addition to the cam holding pocket form shown in the first embodiment and except that minute labyrinths 23 and 24 are formed between the outer flange 22a and an inner peripheral surface 5 of the outer race and between the inner flange 22b and an outer peripheral surface 6 of the inner race for providing a non-contact seal function (see FIG. 4 and FIG. 5).

The second embodiment has the same configuration and function as the first embodiment except the form of the cam holding pocket 15. Parts identical with those previously described with reference to FIG. 1 to FIG. 3 are denoted by the same reference numerals in FIG. 4 and FIG. 5 and will not be discussed again.

Further, the outer flange 22a and the inner flange 22b serve as a grease dam, thus eliminating the need for shield 16. In the embodiment, grooves are not formed on the raceway surfaces of both the races either and the costs can also be reduced accordingly.

[Third Embodiment]

Figure 6:
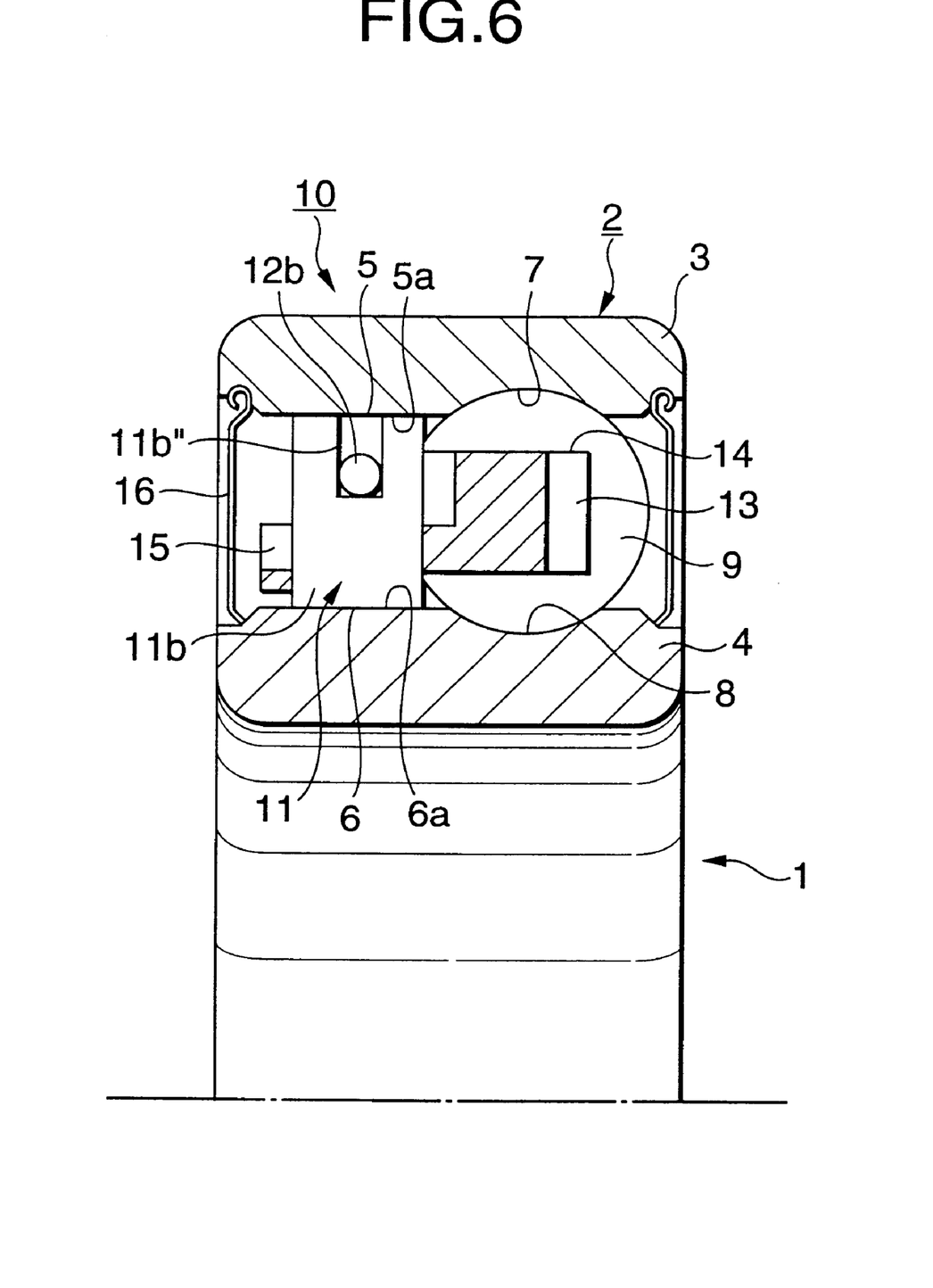
FIG. 6 is a fragmentary longitudinal sectional front view to show a third embodiment of the invention.
Figure 7:
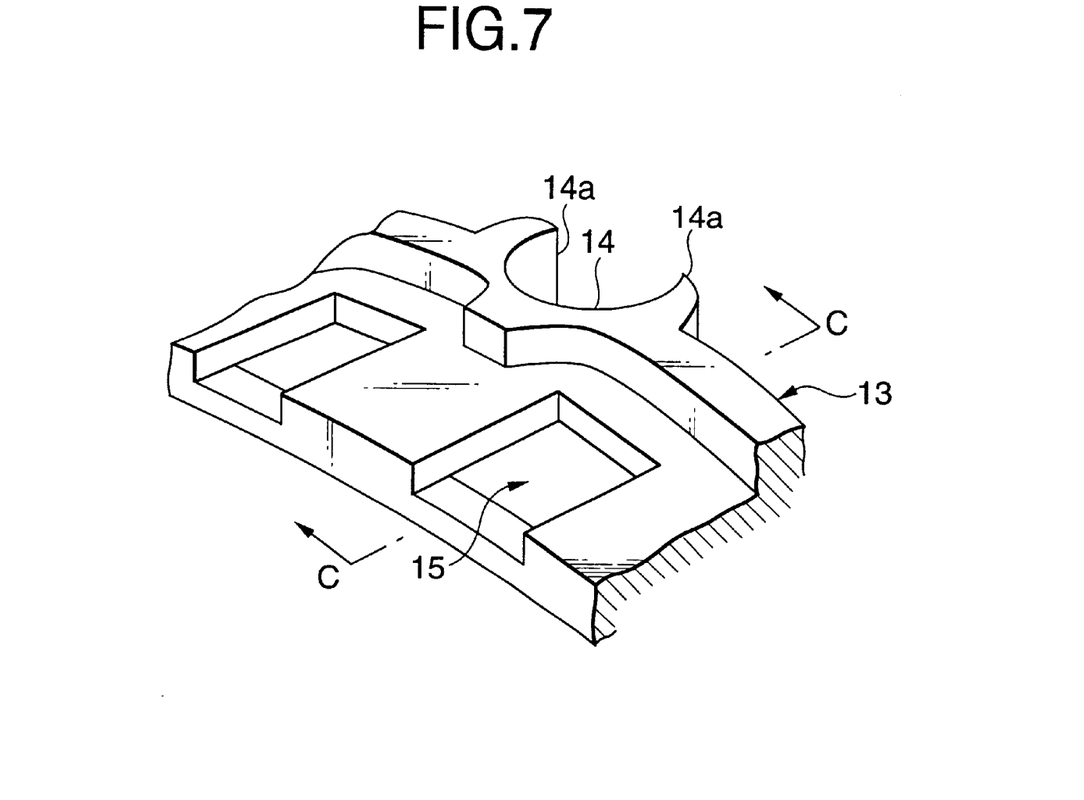
FIG. 7 is an enlarged fragmentary perspective view to show an example of a cage in the third embodiment of the invention.
Figure 8:
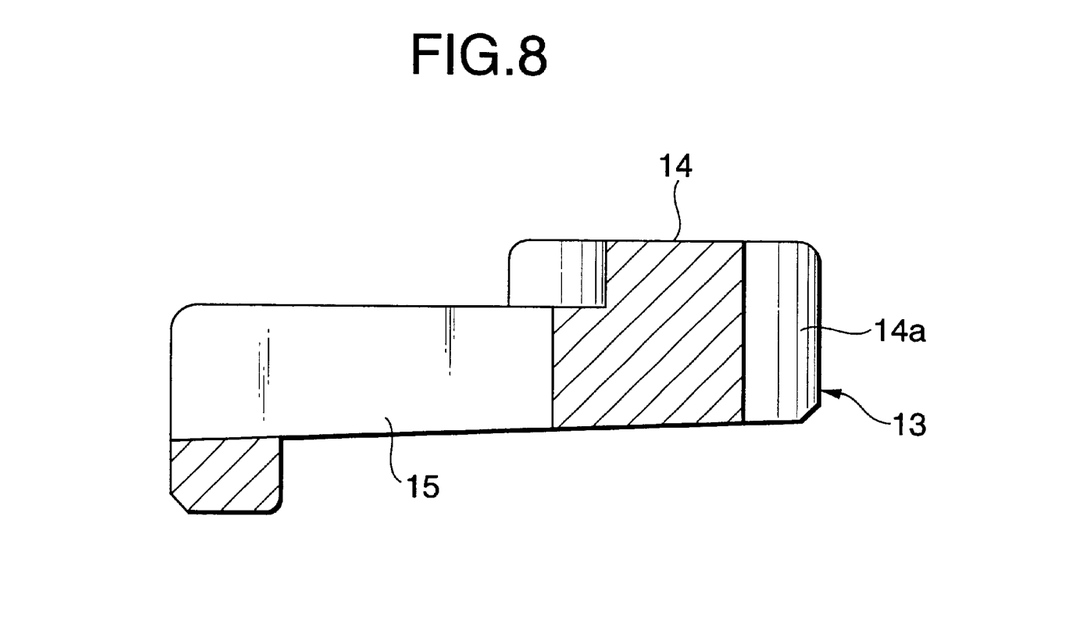
FIG. 8 is a sectional view taken on line C—C in FIG. 7.

A third embodiment of the invention has a roughly similar configuration to that of the first embodiment except that the wedge element holding pocket (cam holding pocket) 15 form of an integral-type cage 13 is changed to the cam holding pocket form shown in the first embodiment (see FIG. 6 to FIG. 8).

That is, the integral-type cage 13 in the third embodiment comprises pawls 14a, a plurality of ball pawl pockets 14 for holding balls 9, and cam (wedge element) holding pockets 15 having cam holding holes for holding cams 11b. The ball pawl pockets 14 and the cam holding pockets 15 are placed back to back and molded in one piece by axial draw. The rolling elements 9 and the cams 11b are held by integral-type cage 13 at the same time while being arranged in a circumferential direction.

The third embodiment has the same configuration and function as the first embodiment except the form of the cam holding pocket 15. Parts identical with those previously described with reference to FIG. 1 to FIG. 3 are denoted by the same reference numerals in FIG. 6 to FIG. 8 and will not be discussed again.

The costs can be reduced by manufacturing the bearing components with the axial draw.

[Fourth Embodiment]

A fourth embodiment of the invention has a roughly similar configuration to that of the first embodiment except that each wedge element holding pocket (cam holding pocket) 15 of an integral-type cage 13 is of a claw pocket form having a claw 15a in place of the pocket form having the cam insertion hole shown in the first embodiment, molded in one piece by axial draw (see FIGS. 9 and 10).

The fourth embodiment has the same configuration and function as the first embodiment except the form of the cam holding pocket 15. Parts identical with those previously described with reference to FIG. 1 to FIG. 3 are denoted by the same reference numerals in FIG. 9 and FIG. 10 and will not be discussed again.

The costs can also be reduced by manufacturing the bearing with the axial draw.

[Fifth Embodiment]

In a fifth embodiment of the invention, a plurality of sprags 11a . . . are used as wedge elements 11 and a ribbon spring 12a is used as a spring element 12; they together with balls 9 . . . are held by a single integral-type cage 13 (see FIG. 11 and FIG. 12).

The sprag 11a is formed like a rotatable odd cylinder and comprises a large-diameter part 11a' (see FIG. 12) wider than the width between an inner peripheral surface 5 of an outer race 3 and an outer peripheral surface 6 of an inner race 4 at least in a part and a ribbon spring placement choke part 11a". The ribbon spring 12a is placed across the ribbon spring placement choke part 11a" of each sprag 11a.

The large-diameter part 11a' of the sprag 11a is urged by the ribbon spring 12a so as to always come in contact with the outer race 3 and the inner race 4.

The sprag 11a shown in the embodiment is only an example of the sprag 11a and can be changed arbitrarily in the scope of the invention.

The integral-type cage 13 in the embodiment comprises a plurality of ball pawl pockets 14 for holding balls 9 and sprag (wedge element) holding pockets 15 for holding the sprags 11a. The ball pawl pockets 14 and the sprag holding pockets 15 are placed back to back in one piece for holding the rolling elements 9 and the sprags 11a at the same time.

The ball pawl pockets 14 and the sprag holding pockets 15 are provided in any numbers in response to specific embodiments; the numbers thereof are not limited. In the embodiment, the outer diameter surfaces of the ball pawl pockets 14 and the sprag holding pockets 15 are flush with each other as shown in FIG. 11, but the invention is not limited to it.

Therefore, in the embodiment, as shown in FIG. 11, raceway grooves 7 and 8 are formed at the right side from the center of the races (the outer race 3 and the inner race 4). A bearing part 2 is placed on the right side, and an OWC part 10 is formed in a left side space from the space of the bearing part 2.

Numeral 16 denotes a seal plate. The shown seal plate structure is only an example and any other known structure can be applied in the scope of the invention.

As shown in FIG. 12, when the inner race 4 or the outer race 3 rotates in the arrow (K) direction, racing results and the ribbon spring 12a is always urged in the arrow (L) direction for attempting to correct the attitude. In contrast, when the inner race 4 or the outer race 3 rotates in the opposite direction to the arrow (K) direction in the figure, the bearing is locked by the wedge effect of the sprag 11a with the outer race 3, the inner race 4. Acoustically, a clutch cage, which is of revolution type, is superior to fixed type.

In this case, preferably the surface roughness of a wedge element (sprag) running face 5a, 6a in the inner peripheral surface 5 of the outer race or the outer peripheral surface of the inner race is set to 0.6 μmRa or less to improve silence.

Note that in the case where both of the faces have the surface roughness of are set to 0.6 μmRa or less, the improvement of the silence is ensured.

According to the invention, there can be provided OWC containing ball bearings which meet the demand for compacting OWCs and bearings, are reduced in costs, are silent, and are easily handled at the assembly time and installation time because of the described configurations.

That is, the OWC containing ball bearing comprises the bearing part and the OWC part commonly sharing the inner and outer races, in which the rolling elements and the wedge elements are integrally held by the single cage between the inner and outer races. Accordingly, the OWC containing ball bearing can have equivalent functions to those of an ordinal rolling bearing with the same inner diameter, outer diameter, and width dimension as the ordinal rolling bearing and can be designed in a more compact structure than that of the conventional OWC assembly bearing.

A ball cage and a one-way clutch element cage are formed in one piece, so that the cage revolves at the rotation time of the rolling bearing, whereby the relative sliding speed of the one-way clutch element sliding surface between the inner and outer races and the one-way clutch element lowers to about 3/5 as compared with the case where the one-way clutch element cage is made as a separate body. It is extremely advantageous acoustically.

Therefore, the OWC containing ball bearing can precisely meet the compact and silent requirements for use as a bearing with a washing machine.

In the case where the surface roughness on the running face is adjusted according to the present invention, silence of bearings can be improved and silent washing machines, etc., can be provided.

Because of the described configurations, at the assembly time and installation time, the number of parts and the number of assembly steps can be decreased and costs can be reduced. In addition, assembly and installation are facilitated and the need for careful handling as former is eliminated, labor being also saved.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A one-way clutch containing rolling bearing comprising:
    a common inner race;
    a common outer race;
    a bearing part including a plurality of rolling elements;
    a one-way clutch part including a plurality of wedge elements and a spring element, said bearing part and said one-way clutch part sharing said common inner race and said common outer race; and
    a single cage disposed between said common inner race and said common outer race for holding said rolling elements and said wedge elements;
    wherein said single cage has first openings for holding said rolling elements and second openings for holding said wedge elements, said first openings being offset from said second openings along an axial direction of said one-way clutch containing rolling bearing; and
    wherein said single cage is made of a single unit.

2. The one-way clutch containing rolling bearing according to claim 1, wherein each surface of said inner race and said outer race in slide-contact with said wedge elements has a surface roughness of 0.6 μmRa or less.

3. A one-way clutch containing rolling bearing comprising:
    an inner race;
    an outer race;
    a plurality of rolling elements rotatably disposed between said inner race and said outer race;
    one-way clutch elements disposed between said inner race and said outer race and each changeable in posture between (1) a first position preventing a relative rotation between said inner race and said outer race when said inner race is moved relative to said outer race in a first direction, and (2) a second position allowing the relative rotation when said inner race is moved relative to said outer race in a second direction opposite to the first direction; and
    a common cage disposed between said inner race and said outer race for holding said rolling elements and said one-way clutch elements;
    wherein said common cage has first openings for holding said rolling elements and second openings for holding said one-way clutch elements, said first openings being offset from said second openings along an axial direction of said one-way clutch containing rolling bearing; and
    wherein said common cage is made of a single unit.

4. The one-way clutch containing rolling bearing according to claim 3, further comprising:
    a spring member which urges each of said one-way clutch elements towards the first position.

5. The one-way clutch containing rolling bearing according to claim 3, wherein each of said one-way clutch elements has a cross section that includes a first portion which is always brought in slide-contact with an inner peripheral surface of said outer race and a second portion which is always brought in slide-contact with an outer peripheral surface of said inner race when the posture of said one-way clutch element is in the first position, in which a distance between said first portion and said second portion is longer than a shortest distance between said inner peripheral surface of said outer race and said outer peripheral surface of said inner race in a radial direction of said one-way clutch containing rolling bearing.

6. The one-way clutch containing rolling bearing according to claim 3, wherein each of said one-way clutch elements is a wedge element.

7. The one-way clutch containing rolling bearing according to claim 3, wherein both of an outer peripheral surface of said inner race and an inner peripheral surface of said outer race, which are respectively in face-contact with said one-way clutch elements, have a surface roughness of 0.6 μmRa or less.

8. The one-way clutch containing rolling bearing according to claim 4, wherein said spring member is a garter spring.

9. The one-way clutch containing rolling bearing according to claim 4, wherein said spring member is a ribbon spring.

10. The one-way clutch containing rolling bearing according to claim 6, wherein each of said wedge elements is a cam.

11. The one-way clutch containing rolling bearing according to claim 6, wherein each of said wedge elements is a sprag.

12. The one-way clutch containing rolling bearing according to claim 1, wherein each of said plurality of rolling elements includes an axis parallel to said axial direction, each of said plurality of wedge elements includes an axis parallel to said axial direction, and the circumferential position of the axis of one of said plurality of wedge elements is intermediate the circumferential positions of the axes of two adjacent ones of said plurality of rolling elements.

13. The one-way clutch containing rolling bearing according to claim 1, wherein said single cage is a monolith.

14. The one-way clutch containing rolling bearing according to claim 8, wherein each of said one-way clutch elements is a cam having a garter spring placement groove, and said garter spring is placed across the placement groove of each cam.

15. The one-way clutch containing rolling bearing according to claim 14, wherein a large-diameter part of said cams is urged by said garter spring so as to always come in contact with said outer race and said inner race.

* * * * *